INVENTORS
JOHN H. KING, JR.
CYRIL J. TUNIS
MITCHELL P. MARCUS

ATTORNEY

INVENTORS
JOHN H. KING, JR.
CYRIL J. TUNIS
MITCHELL P. MARCUS

ATTORNEY

May 27, 1969 J. H. KING, JR., ET AL 3,446,950

ADAPTIVE CATEGORIZER

Filed Dec. 31, 1963 Sheet 3 of 3

INVENTORS
JOHN H. KING, JR.
CYRIL J. TUNIS
MITCHELL P. MARCUS

ATTORNEY

United States Patent Office 3,446,950
Patented May 27, 1969

3,446,950
ADAPTIVE CATEGORIZER

John H. King, Jr., and Cyril J. Tunis, Endwell, and Mitchell P. Marcus, Binghamton, N.Y., assignors to International Business Machines Corporation, New York, N.Y., a corporation of New York Filed Dec. 31, 1963, Ser. No. 334,765
Int. Cl. G06g 7/28; G06f 7/02; G11b 13/04
U.S. Cl. 235—197 17 Claims This invention relates to data processing. More particularly, it relates to an adaptive system for translating input information into output information, i.e., categorizing the input information, including the ability to change the translation process to conform the output information generated to that desired for given input information.

The invention finds particular application in the field of pattern recognition. For example, in the automatic recognition of typewritten and printed characters, a character to be recognized is typically presented to a matrix of detection cells which generate output signals representative of the distribution of the character within the matrix. Analyzing circuits are employed responsive to various combinations of signals from the detection cells for generating an output signal representative of the character within the matrix.

It has been found that the capabilities of pattern recognition systems can be greatly increased if the systems are made adaptive, i.e., if they are subjected to a process of adaption or learning so that, as the system functions to categorize patterns, it is capable of being changed in response to mistakes and made to correct for such mistakes.

The present invention is directed toward an adaptive system for translating input information into output information and for modifying the translation process (during the learning procedure) whenever it is determined that the translation is incorrect.

The invention is embodied in a system utilizing a plurality of function computers each of which receives a set of input signals corresponding, for example, to the distribution of a pattern presented to a matrix of detection cells. Within each of the function computers, the input signals are acted upon to provide an output signal. In particular, each of the function computers acts upon the input signals differently so that, for a particular set of input signals corresponding to a particular pattern, an output signal is generated by the function computer designated to correspond to the particular pattern. The function computers are all interrogated to determine which of the computers actually generate output signals. This information, together with information supplied to the system indicating which pattern was actually presented for recognition, is employed to modify the function computers to compensate for any erroneous output signals which may have been generated.

A preferred embodiment of the invention utilizes a plurality of function computers, each of which corresponds to a different class of patterns to be recognized and each of which weights the input signals applied thereto and performs a linear summation of the weighted input signals. The computer that generates the largest output signal for a particular set of input signals is taken as corresponding to the particular input pattern class presented for recognition. This computer, as well as all other computers that generate signals within a predetermined range of the largest signal, are selected. In response to signals indicating which of the computers should generate the largest output signal for the particular set of input signals, the selected computers are modified, i.e., to selectively increment and decrement the weighting of the active input signals therein to conform the system to the desired output signal. Specifically, the function computer that should generate an output signal has the weighting of each of its active input signals incremented to increase the magnitude of the output signal generated. The others of the selected function computers have the weighting of the active input signals decremented so that the output signals are reduced.

This incrementing and decrementing of weighting is employed for each of a set of input signals corresponding to each of a different class of patterns to adjust and adapt the system to the different classes of patterns. The learning process continues, with the system being supplied with signals representative of the output information desired, until the appropriate one of the function computers generates the largest output signal for each of the different classes of patterns.

A more complete understanding of the invention may be obtained by consulting the following detailed description, which is to be read in conjunction with the appended drawings, in which.

FIGURE 1

Figure 1:
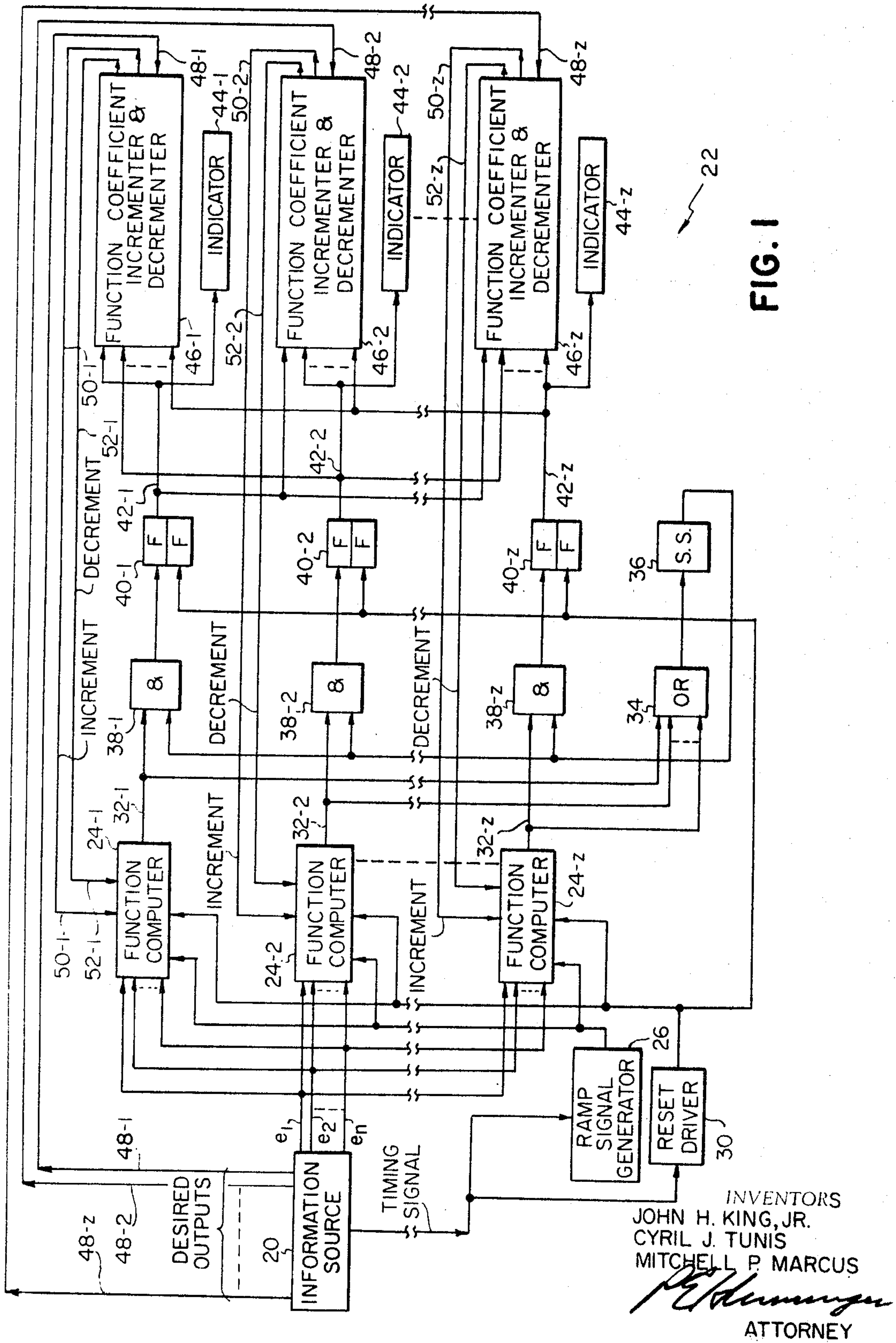
FIG. 1 is a block diagram of a representative system in accordance with the invention.

Referring to FIG. 1, an information source 20 generates signals $e_1, e_2 \ldots e_n$ which are input signals to an adaptive system 22. The input signals, for example, may be representative of the states of detection cells (not shown) which together form a matrix to which is presented a character of recognition. The shape, position and size of the character within the matrix determine the states of the detection cells and hence the states of the input signals $e_1, e_2 \ldots e_n$.

The signals $e_1, e_2 \ldots e_n$ are applied to a plurality of function computers 24–1, 24–2 . . . **24–*z*, each of which, in the example chosen, corresponds to a different character to be recognized. For example, if the characters to be recognized are the twenty-six letters of the alphabet, twenty-six function computers are required for the system. Each of the function computers is supplied with a ramp or sawtooth signal generated by a ramp signal generator 26, the ramp signal being initiated by a timing signal generated by the information source 20. The timing signal is also applied to a reset driver 30** which generates a reset signal applied to each of the function computers. The timing signal is generated each time that the input signals $e_1, e_2 \ldots e_n$ change, corresponding to a change in the character presented to the detection matrix, for example.

Each of the function computers translates the input signals $e_1, e_2 \ldots e_n$ into a single signal in accordance with the function of the computer. The ramp signal is chosen so that it steadily decreases from a value which exceeds the largest signal that may be generated by any of the computers. At the time the ramp signal is equal to the signal generated by a computer, an output signal on the corresponding one of output conductors 32–1, 32–2 . . . **32–*z*** is generated.

The conductors 32–1, 32–2 . . . **32–*z* are all coupled to an OR gate 34 which generates an output signal to trigger a single shot or monostable multivibrator 36. An output signal is generated by the single shot for a predetermined time following its triggering, and this signal is applied to AND gates 38–1, 38–2 . . . 38–*z*. Inasmuch as the conductors 32–1, 32–2 . . . 32–*z* are also coupled respectively to the AND gates 38–1, 38–2 . . . 38–*z*, those of the function computers 24 from which the associated output conductors 32 are energized activate the associated AND gates 38**.

It will be noted, then, that those AND gates 38 are energized corresponding to the function computer 24 that has the highest generated signal, which caused the triggering of the single shot 36, and those function computers generating output signals within a predetermined range below the highest signal. The predetermined range is, of course, determined by the period during which the single shot 36 is on. The single shot 36 goes off by itself, and, although the input thereto from the OR gate 34 persists, the single shot cannot be triggered again until it is reset by the removal of the signal applied thereto at the end of a cycle.

The AND gates 38–1, 38–2 . . . 38–*z* are coupled to associated flip-flops or bistable multivibrators 40–1, 40–2 . . . 40–*z*. The flip-flops are all reset at the beginning of a cycle by the signal from the reset driver 20. Those of the flip-flops set by the signals from the corresponding ones of the activated AND gates 38 generate output signals on conductors 42–1, 42–2 . . . 42–*z*. The conductors 42 are coupled to indicators 44–1, 44–2 . . . 44–*z* which provide indications of the function computer with the largest output signal and those other function computers with output signals within the predetermined range.

The conductors 42–1, 42–2 . . . 42–*z* are also coupled to function coefficient incrementers are decrementers 46–1, 46–2 . . . 46–*z*. Each of the incrementers and decrementers is supplied with a signal from the information source 20 on an associated one of conductors 48–1, 48–2 . . . 48–*z* representative of the output from the system 22 that is desired. For example, if the indicator 44–1 corresponds to the alphabetic character A, and this character is presently being presented, a signal is generated on the conductor 48–1 coupled to the incrementer and decrementer 46–1.

Output signals from the incrementers and decrementers 46–1, 46–2 . . . 46–*z* appear on increment conductors 50–1, 50–2 . . . 50–*z* and on decrement conductors 52–1, 52–2 . . . 52–*z* coupled to the function computers 24–1, 24–2 . . . 24–*z*. The incrementers and decrementers 46 operate so that a signal is generated on a decrement conductor to reduce the magnitude of the signal generated by the associated function computer if that computer does not correspond to the output actually desired. An increment signal causes the signal from the associated function computer to increase still further in magnitude. This occurs when the function computer signal is the desired output signal. If the function computer that generates the highest output signal is the one corresponding to the pattern presented for recognition, and the associated flip-flop 40 is the only flip-flop set, then none of the incrementing and decrementing conductors 50 and 52 is energized.

Thus the system of FIG. 1 operates to generate output information in response to selected sets of input signals corresponding to different patterns to be recognized. In the event that an output indication is incorrect, the system is changed to compensate for the incorrect output. This continues for as long as necessary for each of a number of different patterns to be recognized until the system functions properly so that all patterns are properly categorized when presented for recognition.

FIGURE 2

Figure 2:
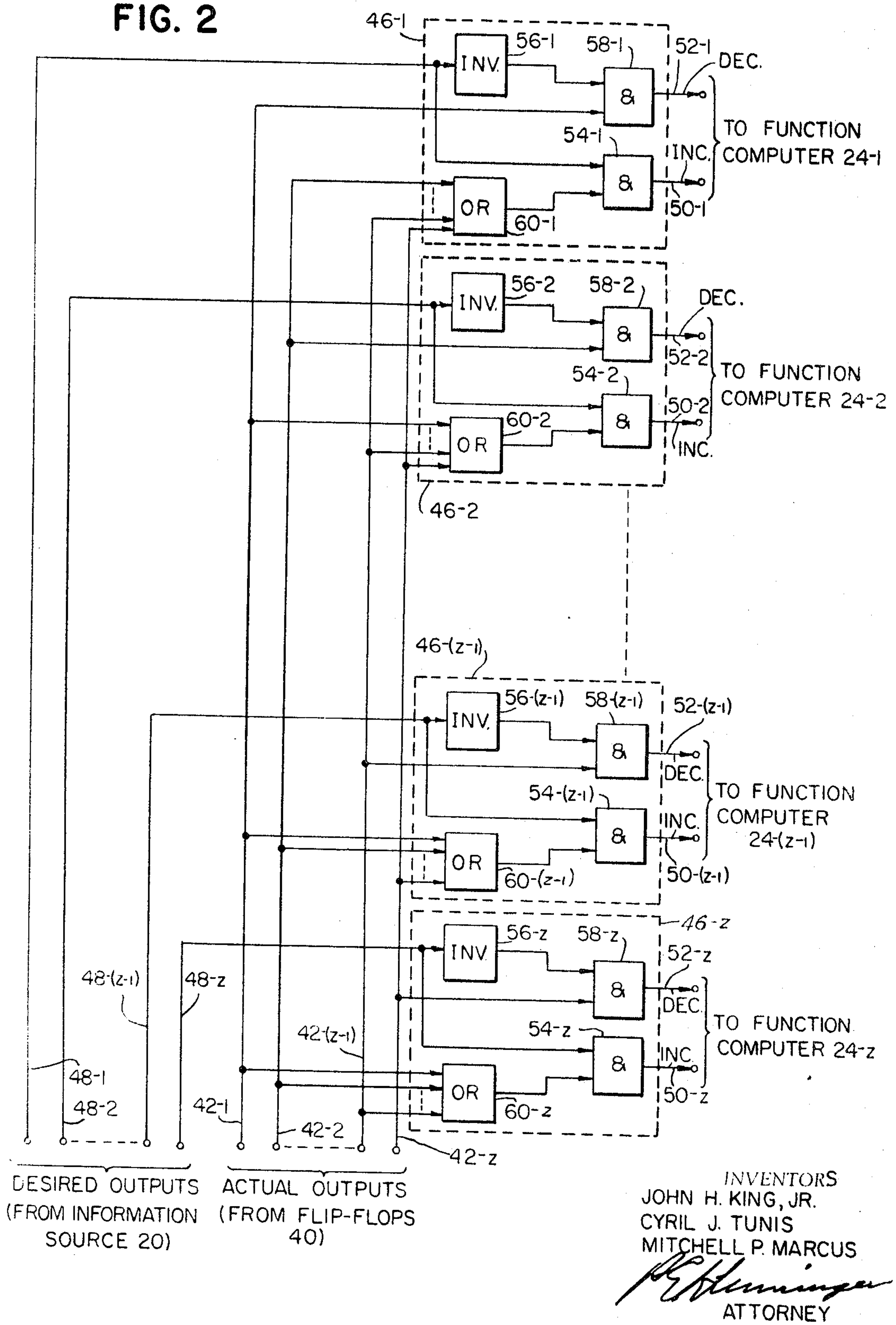
FIG. 2 is a block diagram of a portion of the system of FIG. 1.

FIG. 2 is a detailed block diagram of the function coefficient incrementers and decrementers 46 of FIG. 1. For simplicity of explanation, four of such incrementers and decrementers are shown, namely 46–1, 46–2, 46–(*z*–1) and 46–*z*. Signals representative of the desired outputs appear on conductors 48–1, 48–2 . . . 48–(*z*–1) and 48–*z*. For any particular cycle, e.g., for a given pattern to be recognized, only one of the conductors is energized. The actual outputs, i.e., the signals from the flip-flops 40 of FIG. 1, appear on conductors 42–1, 42–2 . . . 42–(*z*–1) and 42–*z*. For any cycle, one or more of the conductors are energized.

Each of the incrementers and decrementers 46 is formed from identical components similarly interconnected. Consider, for example, the incrementer and decrementer 46–1. The input conductor 48–1 is coupled directly to an AND gate 54–1 and through an inverter 56–1 to an AND gate 58–1. Another input to the AND gate 54–1 is derived from an OR gate 60–1 which receives input signals from the conductors 42–2 . . . 42–(*z*–1) and 42–*z*. It will be noted that the OR gate 60–1 receives input signals from the conductors representing the outputs of all of the flip-flops 40 (FIG. 1) except the flip-flop 40–1 associated with the function computer 24–1. Thus each of the OR gates 60 receives input signals from all the flip-flops 40 except the flip-flop associated with the function computer 24 to which the incrementer and decrementer is coupled.

The AND gate 58–1 of the incrementer and decrementer 46–1 receives its other input from the conductor 42–1. It will be noted that each of the AND gates 58 receives as enabling inputs a signal from the conductor 48 (after inversion), representing whether or not an output is desired, and a signal from the conductor 42, representing whether or not an output was actually generated.

The operation of the circuit of FIG. 2 is best described through the use of a few specific examples.

*Example 1*

Assume in the circuit of FIG. 1 that, in a particular cycle, the flip-flops 40–1 and 40–2 energize the conductors 42–1 and 42–2. Assume further, however, that the desired output conductor 48–1 is energized, indicating that ideally only the flip-flop 40–1 should be set energizing the associated conductor 42–1. Turning to FIG. 2, the conductor 48–1 energizes one of the inputs of the AND gate 54–1. Because of the action of the inverter 56–1, the AND gate 58–1 cannot become activated. The conductors 42–1 and 42–2, of all the conductors 42, are energized. The conductor 42–2 activates the OR gate 60–1, which activates the AND gate 54–1, generating a signal on the increment conductor 50–1.

At the same time, the conductor 42–2, which is energized, energizes one of the inputs to the AND gate 58–2. The conductor 48–2 is de-energized; however, by the action of the inverter 56–2, a signal is provided to the other input of the AND gate 58–2. The AND gate is thus activated, generating a signal on the decrement conductor 52–2.

In the example chosen, the increment conductor 50–1 is energized, incrementing or increasing the signal generated by the function computer 24–1, which is a desired output (flip-flop 40–1). The decrement conductor 52–2 is energized, leading to a decrementing or lowering of the signal generated by the function computer 24–2, which is an undesired output (flip-flop 40–2). This increases the spread between the potentials generated by the function computers 24–1 and 24–2 for the same set of input signals $e_1, e_2 \ldots e_n$. Ultimately, for this set of input signals, the flip-flop 40–1 will be the only flip-flop energized. This may take one or more cycles of correction as just described.

*Example 2*

Assume that the flip-flop 40–1 of FIG. 1 is set, energizing the conductor 42–1. Assume further that the desired output conductor 48–1 is energized. In this case, the only actual output is the desired output. In FIG. 2, although the conductor 42–1 energizes one input of the AND gate 58–1, the inverting action provided by the inverter 56–1 de-energizes the other input to the AND gate. Further, although the conductor 48–1 energizes one input of the AND gate 54–1, none of the inputs of the OR gate 60–1 is energized, and the AND gate 54–1 cannot be activated. None of the other AND gates 54 and 58 is activated.

From the examples given above, it is apparent that when any one of the conductors 48 is de-energized and the associated one of the conductors 42 is energized, indicating that an output is present which is undesired, the associated one of AND gates 58 is energized, resulting in a decrement signal to the associated function computer 24. If one of the conductors 48 is energized and any of the conductors 42 except the associated conductor is energized, indicating the occurrence of one or more outputs that do not include the output desired, the AND gate 54 associated with the function computer 24 whose output is desired is energized, providing an increment signal to the function computer.

FIGURE 3

Figure 3:
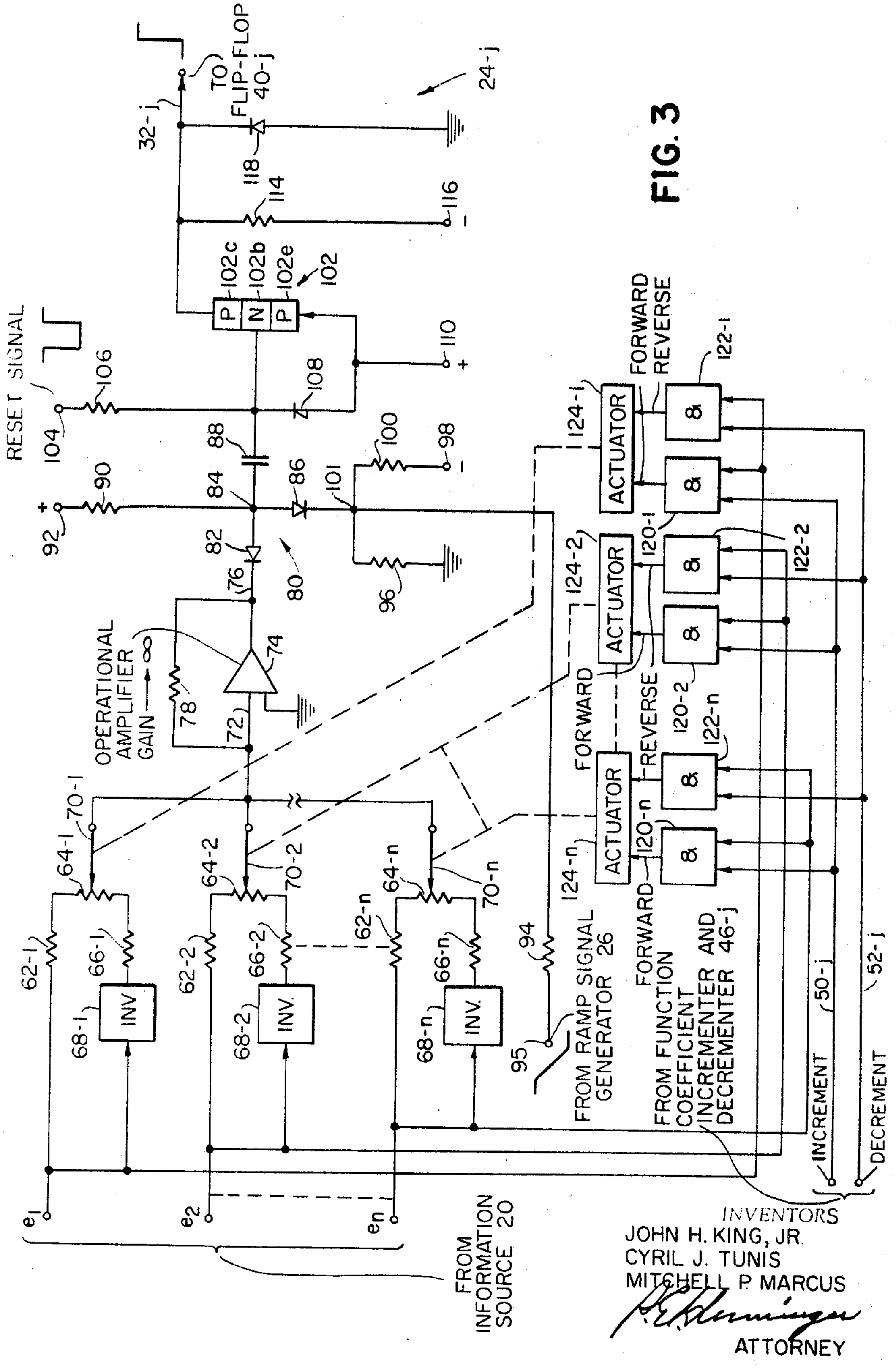
FIG. 3 is a block and detailed schematic circuit diagram of a portion of the system of FIG. 1.

FIG. 3 shows in detail a typical one of function computers 24, all of which are constructed in the same fashion. The *j*th function computer **24–*j*** is shown.

The signals $e_1, e_2 \ldots e_n$ from the information source 20 of FIG. 1 are applied through resistors **62–1, 62–2 . . . 62–*n*, respectively, to one side of potentiometers 64–1, 64–2 . . . 64*n*. The other sides of these potentiometers are coupled through resistors 66–1, 66–2 . . . 66–*n* to inverters 68–1, 68–2 . . . 68–*n* which also receive the input signals $e_1, e_2 \ldots e_n$. Movable potentiometer contacts 70–1, 70–2 . . . 70–*n* are electrically connected to a common conductor 72 which serves as an input to an operational amplifier 74, the other input to which is grounded. The output of the operational amplifier, appearing on conductor 76, is fed back to the input conductor 72 through a resistor 78**.

The gain of the operational amplifier 74 is chosen sufficiently high so that for practical purposes it may be considered as approaching infinity. In this case, the input conductance of the amplifier is virtually equal to 0 with respect to the conductances looking into the potentiometers **64–1, 64–2 . . . 62*n*. In this respect, the associated input resistors 62 and 66** ensure that none of these conductances can approach 0, thereby maintaining this relationship.

The currents flowing in the potentiometer contacts **70–1, 70–2 . . . 70–*n*, directly related to the potentials $e_1, e_2 \ldots e_n$ as modified or "weighted" by the settings of the potentiometers, are summed in the conductor 72 applied to the operational amplifier 74. The output signal of the operational amplifier is a potential representative of the sum of the currents flowing in the input conductor 72**.

The signal at the conductor 76 is coupled to a circuit 80 which is the same as that shown in a portion of FIG. 1 of the copending application of Ivars G. Akmenkalns for Threshold Logic Circuitry, Ser. No. 320,444 filed Oct. 31, 1963 (IBM docket 6545) and assigned to the assignee of the present application.

The circuit 80 includes a diode 82 which couples the conductor 76 to a junction 84 to which are coupled a diode 86, a capacitor 88 and a resistor 90. The resistor 90 is supplied with a suitable positive potential at a terminal 92. The diode 86 is coupled through a resistor 94 to a terminal 95 which receives the signal from the ramp signal generator 26 of FIG. 1. The diode 86 is also coupled to a common potential such as ground through a resistor 96 as well as to a source of negative potential at a terminal 98 through a resistor 100. The capacitor 88 is coupled to base **102*b* of a transistor 102 as well as to a terminal 104 through a resistor 106. Base 102*b* and emitter 102*e* are coupled together through a tunnel diode 108. The tunnel diode and the emitter are coupled to a source of positive potential applied to a terminal 110. Collector 102*c* of the transistor is coupled to the output conductor 32–*j* which is connected to the flip-flop 40–*j***, of the *j*th circuit of FIG. 1. Collector **102*c* is also connected through a resistor 114 to a terminal 116 supplied with a negative potential and to ground through a diode 118**.

A reset signal applied to the terminal 104 places the tunnel diode 108 in the lower of its two voltage states. This results in the transistor 102 being placed in a state of nonconduction, lowering the potential of the output conductor **32–*j*. In this regard, the diode 118** prevents the potential of the output conductor from falling below ground.

Following the application of the reset signal to the terminal 104, the ramp signal applied to the terminal 95 commences. The ramp signal at junction 101 of the resistor 94 and diode 86 commences at a potential which is higher than the potential of the conductor 76, representing the sum of the input signals $e_1, e_2 \ldots e_n$ as weighted by the potentiometers **64–1, 64–2 . . . 64–*n*. Diode 82 is forwardly biased and conductive, while the diode 86 is back-biased and nonconductive. The output potential of the operational amplifier 74 plus the forward drop of diode 82 is thus applied to the junction 84. The signal at the junction 84 remains constant at this value for as long as the ramp signal at the junction 101 exceeds the potential of the conductor 76, assuming that the diodes 82 and 86** are a matched pair.

When the potential of the decreasing ramp signal at junction 101 is equal to the potential of the conductor 76, the diode 86 becomes forwardly biased and conductive, and the diode 82 becomes back-biased and nonconductive. The potential of the junction 84 thus commences to fall following the falling ramp signal. This change in the potential of the junction is communicated through the capacitor 88 to the tunnel diode 108 which then switches to its higher voltage state. The transistor 102 is switched on and conducts, which raises the potential at the output conductor **32–*j* to produce a positive output signal. This is the signal that sets the associated flip-flop 40–*j*** (FIG. 1).

The incrementing and decrementing action in the circuit of FIG. 3 is accomplished as follows: The increment conductor **50–*j* supplies an enabling input to each of AND gates 120–1, 120–2 . . . 120–*n*, while the decrement conductor 52–*j* supplies an enabling input to each of AND gates 122–1, 122–2 . . . 122–*n*. The AND gates 120–1 and 122–1 provide control inputs to an actuator 124–1 coupled to the potentiometer contact 70–1. The AND gates 120–2 and 122–2 provide control inputs to an actuator 124–2 coupled to the potentiometer contact 70–2. Actuator 124–*n* is similarly connected to control the position of the potentiometer contact 70–*n***.

Each of the AND gates 120–1 and 122–1 receives an enabling input signal $e_1$. Each of the AND gates 120–2 and 122–2 receives an enabling signal $e_2$. AND gates **120–*n* and 122–*n*** each receive an enabling signal $e_n$.

Assume now that an increment signal appears on the conductor **50–*j*. Accordingly, each of the AND gates 120–1, 120–2 . . . 120–*n* has one input thereof energized. Selected ones of the signals $e_1, e_2 \ldots e_n$ are energized, thereby activating the associated ones of AND gates 120–1, 120–2 . . . 120–*n*. The associated ones of the actuators 124–1, 124–2 . . . 124–*n* are energized and move the associated potentiometer contacts 70–1, 70–2 . . . 70–*n* to increment the weighting of the associated ones of the active signals $e_1, e_2 \ldots e_n$ and to increase the signal developed by the operational amplifier 74. The actuators 124 typically change the associated potentiometer contacts 70** each by a unit amount, which may be accomplished through the use of stepping switches, for example.

In the same fashion, a signal on the decrement conductor **52–*j* provides an enabling input to each of AND gates 122–1, 122–2 . . . 122–*n*. Depending upon which of these AND gates is activated by the signals $e_1, e_2 \ldots e_n$, the associated actuators 124–1, 124–2 . . . 124–*n* are selectively energized in a reverse direction to change the associated ones of potentiometer contacts 70–1, 70–2 . . . 70–*n*. Accordingly, the weighting provided by each of potentiometers 64–1, 64–2 . . . 64–*n* is changed to decrease the magnitude of the signal developed by the operational amplifier 74** in accordance with the decrement instruction received.

In this regard, it will be noted that the inverters 68–1, 68–2 . . . 68–$n$ permit negative weights to be employed in the weighting of the input signals $e_1, e_2 \ldots e_n$.

By changing the weighting of the active signals $e_1, e_2 \ldots e_n$, the output signal from the operational amplifier 74 is changed so as to change the time in a cycle when the output conductor 32–$j$ is energized and sets the associated flip-flop 40–$j$.

SUMMARY

It will be noted that an adaptive system for generating output information has been provided. While the invention has been particularly shown and described with reference to a preferred embodiment thereof, it will be understood by those skilled in the art that various changes in form and detail may be made therein, without departing from the spirit and scope of the invention.

What is claimed is:

1. In an adaptive system for generating different output signals in response to different predetermined conditions of a plurality of input signals, the combination of a plurality of function computers each corresponding to a different output signal, means for applying the same input signals to each of the function computers, each of the function computers including weighting means for weighting the input signals and adding means for adding the weighted input signals to generate a sum signal, detecting means for detecting the function computer generating the largest sum signal and those function computers generating sum signals within a predetermined range from the largest sum signal, control means for designating which of the function computers should generate the largest sum signal corresponding to a particular set of conditions of said input signals, and modifying means for adjusting the weighting means forming a part of the function computers detected by the detecting means and designated by the control means to change the weighting of the input signals.

2. An adaptive system as recited in claim 1, wherein the modifying means adjusts the weighting means forming a part of the function computer designated by the control means to increase the weighting of the input signals and thereby to increase the magnitude of the sum signal generated by that function computer, and wherein the modifying means adjusts the weighting means of all of the other function computers detected by the detecting means to decrease the weighting of the input sigals and thereby to reduce the magnitudes of the sum signals generated by those computers.

3. An adaptive system as recited in claim 2, wherein the modifying means makes no adjustment of the weighting means when the function computer detected by the detecting means as generating the largest sum signal is designated by the control means and no other function computer is detected by the detecting means.

4. An adaptive system as recited in claim 2, wherein the modifying means comprises a plurality of AND gate means, each of the AND gate means controlling the increasing of the weighting of the input signals for a different one of the function computers, and each AND gate means being activated by the detecting means detecting any other function computer than the function computer controlled by the AND gate means and by the control means designating the function computer controlled by the AND gate means.

5. An adaptive system as recited in claim 2, wherein the modifying means comprises a plurality of AND gate means, each of the AND gate means controlling the decreasing of the weighting of the input signals for a different one of the function computers, and each AND gate means being activated by the detecting means detecting the function computer controlled by the AND gate means and by the control means not designating the function computer controlled by the AND gate means.

6. An adaptive system as recited in claim 2, wherein the input signals are active or inactive, and wherein the modifying means adjusts the weighting means to change the weighting of only the active input signals in the designated and detected function computers.

7. An adaptive system as recited in claim 6 wherein the modifying means adjusts the weighting means so that the changed weighting of each of the affected input signals is by a unit amount.

8. A system as recited in claim 1, wherein the detecting means comprises a ramp signal generator for generating a decreasing ramp signal, the ramp signal commencing at a level higher than the largest sum signal that may be generated by any of the function computers, signal generating means forming a part of each of the function computers for generating an output signal when the ramp signal is substantially equal to the sum signal generated by the function computer. OR gate means coupled to the signal generating means of all of the function computers for generating a triggering signal whenever one of the signal generating means generates an output signal, means responsive to the initiation of the triggering signal for generating a signal of predetermined duration, and means for detecting those of the output signals generated during the duration of the signal of predetermined duration.

9. In an adaptive system for generating different output signals in response to different predetermined conditions of a plurality of input signals, the combination of a plurality of function computers, means for applying the same input signals to each of the function computers, each of the function computers including means for translating the plurality of input signals into a composite output signal, means for generating an independent control signal designating which of the function computers should generate a distinguishing composite output signal corresponding to a particular set of conditions of said input signals, and means receiving the control signal and the composite output signals generated by the function computers and responsive to the received signals for adjusting the translation effected by the function computers of the input signals having said particular set of conditions so that said distinguishing composite output signal will be generated by the function computer designated by the control signal when input signals having said particular set of conditions are again received.

10. In an adaptive system for generating different output signals in response to different predetermined conditions of a plurality of input signals, the combination of a plurality of function computers, means for applying the same input signals to each of the function computers, each of the function computers including means for translating the plurality of input signals into a composite output signal, detecting means for detecting the function computer generating a composite signal having a distinquishing characteristic and those function computers generating composite signals within a predetermined range thereof, means for generating a control signal designating which of the function computers should generate a composite output signal having said distinguishing characteristic in response to a particular set of conditions of said input signals, and means receiving the control signal and the composite output signals generated by the function computers and responsive to the received signals for adjusting the translation effected by said detected and designated function computers of the input signals having said particular set of conditions.

11. In an adaptive system for generating different output signals in response to different predetermined conditions of a plurality of input signals, the combination of a plurality of function computers each corresponding to a different output signal, means for applying the same input signals to each of the function computers, each of the function computers including weighting means for weighting the input signals and adding means for adding the weighted input signals to generate a sum signal, detecting means for detecting the function computer generating the largest sum signal and those function computers generating sum signals within a predetermined range from the largest sum signal, and modifying means for adjusting the weighting means forming a part of the function computers detected by the detecting means to change the weighting of the input signals.

12. In a method of controlling a system for generating different output signals in response to different predetermined conditions of a plurality of input signals, the steps of receiving the same plurality of input signals at each of a predetermined number of locations, generating at each location a composite output signal translated from the plurality of input signals, preestablishing one of the locations as that which should generate a composite output signal having a distinguishing characteristic in response to input signals having a particular set of conditions, determining which location actually generates a composite output signal having said distinguishing characteristic for said particular set of conditions, and adjusting the translation of the input signals at a plurality of the locations so that said distinguishing composite output signal corresponding to said particular set of conditions of said input signals will be generated only at said preestablished location when input signals having said particular set of conditions are again received.

13. In a method of controlling a system for generating different output signals in response to different predetermined conditions of a plurality of input signals, the steps of receiving the same plurality of input signals at each of a predetermined number of locations, generating at each location a composite output signal translated from said plurality of input signals, determining which of said composite signals has a distinguishing characteristic for a particular set of condition of said input signals, determining all of the composite signals within a predetermined range from said signal determined as having said distinguishing characteristic, and adjusting the translation of the input signals at the locations corresponding to the determined composite signals and at a location preestablished as corresponding to said particular set of conditions of said input signals so that said distinguishing composite output signal is generated at said preestablished location in response to said particular set of conditions of said input signals.

14. In a method of controlling a system for generating different output signals in response to different predetermined conditions of a plurality of input signals, the steps of receiving the same set of input signals at each of a predetermined number of locations, weighting the input signals received at each of said locations, adding the weighted input signals produced at each location to produce a sum signal for each location, determining which of said sum signals is the largest, determining all of the sum signals within a predetermined range from said largest sum signal, and adjusting the amount of said weighting at the locations corresponding to the determined sum signals.

15. A method as recited in claim 14, wherein the weighting of the input signals is increased at a location preestablished as corresponding to a particular set of conditions of said input signals so as to increase the magnitude of the sum signal generated at that location and the weighting is decreased at all other locations corresponding to said determined sum signals so as to reduce the magnitudes of the sum signals generated at those locations.

16. A method as recited in claim 15, wherein no adjustments of the weighting of the input signals are made at any locations when the largest determined sum signal is generated at the location corresponding to that preestablished as corresponding to said particular set of conditions of said input signals and no other sum signals are determined as being within said predetermined range.

17. A method as recited in claim 14, wherein the input signals to the system are active or inactive, and wherein the weighting at the locations corresponding to the determined sum signals is adjusted so that only the weighting of active input signals is adjusted.

References Cited

UNITED STATES PATENTS

| | | | |
|---|---|---|---|
| 3,128,449 | 4/1964 | Armstrong | 340—146.1 |
| 3,235,844 | 2/1966 | White | 340—172.5 |
| 3,022,005 | 2/1962 | Dickinson | 340—172.5 |
| 3,046,527 | 7/1962 | Rowley | 340—172.5 |
| 3,103,648 | 9/1963 | Hartmanis | 340—172.5 |
| 3,114,884 | 12/1963 | Jakowatz | 340—172.5 |
| 3,174,031 | 3/1965 | Hartmanis et al. | 340—172.5 X |
| 3,174,032 | 3/1965 | White | 340—172.5 X |

MALCOLM A. MORRISON, *Primary Examiner.*

R. W. WEIG, *Assistant Examiner.*

U.S. Cl. X.R.

340—146.3, 172.5